United States Patent [19]
Berkovits

[11] 3,766,413
[45] Oct. 16, 1973

[54] RATE DISCRIMINATION CIRCUIT
[75] Inventor: Barouh V. Berkovits, Newton Highlands, Mass.
[73] Assignee: American Optical Corporation, Southbridge, Mass.
[22] Filed: Jan. 3, 1972
[21] Appl. No.: 214,976

Related U.S. Application Data
[62] Division of Ser. No. 884,825, Dec. 15, 1969, Pat. No. 3,661,158.

[52] U.S. Cl.............. 307/294, 328/138, 307/233, 128/419 P, 128/422
[51] Int. Cl. ............................................. H03k 5/13
[58] Field of Search...................... 307/294, 233; 328/138; 128/419 P, 422

[56] References Cited
UNITED STATES PATENTS
| | | | |
|---|---|---|---|
| 3,547,127 | 12/1970 | Anderson | 128/419 P |
| 3,263,096 | 7/1966 | Willard | 307/233 X |
| 3,331,967 | 7/1967 | Moore | 307/294 |
| 3,334,249 | 8/1967 | White | 307/294 X |
| 3,348,065 | 10/1967 | Schmidt | 307/294 X |
| 3,414,735 | 12/1968 | Harris et al. | 307/294 X |

Primary Examiner—John S. Heyman
Attorney—William C. Nealon

[57] ABSTRACT

A rate discrimination circuit. A circuit is disclosed which discriminates between pulses occurring at a high rate and pulses occurring at a low rate on a pulse-by-pulse basis. The interval between successive pulses is used to control the extent of charging and discharging of a capacitor which in turn controls a switch. The circuitry can be used to discriminate against noise occurring at a 60 hertz rate. The circuitry is particularly useful in a demand cardiacpacer where the EKG signals contain near 60 hertz harmonics but occur at about a 1 hertz rate. Thus, the circuitry of the present invention is described in connection with its use in an atrial and ventricular demand pacer.

1 Claim, 4 Drawing Figures

RATE DISCRIMINATION CIRCUIT

This patent application is a division of my copending patent application, Ser. No. 884,825 filed on Dec. 15, 1969 and which has matured into U.S. Pat. No. 3,661,158.

The present invention relates to heart pacers, and more particularly to rate discrimination circuitry used in demand pacers that are used with patients exhibiting symptomatic atrial bradycardia and unpredictable AV block.

The electrical activity of a normal heart begins with a nerve impulse generated by a bundle of fibers located in the sinoatrial node. The impulse spreads across the two atria while they contract and speed the flow of blood into the ventricles underneath them. The atrial activity of the heart corresponds to the P wave in an electrocardiogram trace. The electrical impulse continues to spread across the atrioventricular (AV) node, which in turn stimulates the left and right ventricles. Typically, an interval of approximately 120–160 milliseconds elapses between atrial and ventricular stimulation. The ventricular activity corresponds to the QRS portion of the electrocardiogram, and typically has a duration of 80 milliseconds. Toward the end of each heartbeat, the ventricular muscles repolarize, and this portion of the electrical activity of the heart corresponds to the T wave in the electrocardiogram.

Of the two types of contractions, the ventricular is far more important than the atrial. The atrial contractions cause the ventricular contractions to be more efficient; the ventricular contractions are more effective if the ventricles are first filled with blood. While a patient can survive without proper atrial action, he cannot survive without ventricular contractions. With an AV block, that is, an AV node which is open-circuited, life cannot be sustained (unless the ventricles somehow beat on their own without AV stimulation, and even in such a case the heartbeat rate is generally far too slow). With proper ventricular contractions, a patient can live even with atrial fibrillation. For this reason, early pacemakers were generally used to protect against ventricular asystole. These pacemakers stimulated the ventricles continuously at a fixed rate to control their contractions.

Following the use of this type of pacemaker for many years, the demand pacemaker was introduced. In a demand pacemaker, electrical heart-stimulating impulses are provided only in the absence of natural heartbeats. If only a single natural heartbeat is absent, only a single electrical impulse is generated. If more than one natural heartbeat is missing, the pacemaker fills in beats at the pacemaker rate as long as the natural beats fail to occur. No matter how many electrical stimuli are generated, they occur at essentially the same time spacing from each other and from previous natural heartbeats — as would be the case if they were all natural heartbeats. The result is an overall "integrated" operation, i.e., a mutually exclusive cooperation of natural heartbeats and stimulating impulses. The demand pacemaker of this type is disclosed in my U.S. Pat. No. 3,345,990 issued on Oct. 10, 1967.

Generally, a demand pacemaker is primed to generate an impulse at a predetermined time after the last natural heartbeat. If another natural heartbeat occurs during the timing interval of the pacemaker, an impulse is not generated and the timing period starts all over again. On the other hand, if a natural heartbeat does not take place by the end of the timing period a stimulating impulse is generated. For the proper operation of a demand pacemaker, the pacemaker circuitry must determine if a natural heartbeat has occurred. The largest magnitude electrical signal generated by the heart activity is the QRS complex corresponding to ventricular contraction. To determine whether a natural heartbeat has occurred, an electrode is generally coupled to a ventricle. Since in most cases ventricular stimulation is required, the same electrode can be used for both stimulating the ventricles and detecting a natural heartbeat, as disclosed in my aforesaid patent.

In the pressure of noise, erroneous operation of a demand pacemaker of this type can take place. The noise may result in the generation of an electrical signal on the ventricular electrode, and the pacemaker circuitry may treat this noise as indicative of a natural heartbeat and inhibit the generation of a stimulating impulse even if one is required. In my co-pending application, Ser. No. 727,129 filed on Apr. 11, 1968, and which has matured into U.S. Pat. No. 3,528,428, an improved demand pacemaker is disclosed. In this improved demand pacemaker, in the presence of noise the pacemaker timing period is not interrupted. Continuous stimulating impulses are generated, even if they are not required. It is better to provide an impulse even if it is not required than it is not to provide an impulse if it is required.

There are many patients with symptomatic atrial bradycardia even though they have normal AV conduction. In such a patient, the slow atrial rate causes the ventricular rate to slow down. Ventricular pacemaker stimulation has been used in the past to treat this disorder. For such patients, however, it would be better to provide atrial stimulation to thus control both the atrial and ventricular rates, with the additional benefit of the natural atrioventricular sequence. But such atrial stimulation would leave the patient unprotected from unpredictable AV block. Thus, provision should also be made for ventricular stimulation if it becomes necessary.

Both types of pacing could be accomplished with the use of two individual pacemakers. But even if they are combined in a single package many problems must be overcome, especially if a demand-type operation is desired. One of the most obvious problems concerns the timing sequence of the two types of pacing. A bifocal demand pacemaker for atrial as well as ventricular stimulation is disclosed in my copending application, Ser. No. 810,519 filed on Mar. 26, 1969 and which has matured into U.S. Pat. No. 3,595,242. The first function of the pacemaker is to generate an atrial stimulating impulse. After a predetermined time interval, the pacemaker functions to generate a ventricular stimulating impulse. Three electrodes are provided — a neutral electrode, an electrode for atrial stimulation and an electrode for ventricular stimulation. The ventricular electrode also serves to detect the occurrence of a ventricular contraction.

The pacemaker exhibits two timing or escape intervals. The ventricular escape interval is 160–250 milliseconds longer than the atrial escape interval. The ventricular escape interval is greater than the normal interval between two heartbeats (as in a typical demand pacemaker). The atrial escape interval is greater than the normal interval between ventricular and atrial beats (R to P), but less than the normal inter-beat interval (R to R). Both timing periods begin with the generation of the last heartbeat (natural or stimulated). If another ventricular contraction does not occur within the atrial timing period, that is, in the absence of a premature ventricular contraction, the atrial stimulating impulse is generated. The atria contract and fill the ventricles with blood. In the event the ventricles contract (i.e., there is no AV block), the detected ECG signal on the ventricular electrode resets both timing circuits and the ventricular impulse is not generated. In the event the ventricular contraction does not occur, a ventricular impulse is generated at the end of the ventricular timing interval.

The atrial stimulating pulse is large in magnitude, in the order of 5 volts, and causes an electrical signal to appear on the ventricular electrode. If this signal is treated as one which results from a ventricular contraction, the ventricular timing circuit will be reset and a ventricular stimulating pulse will not be generated even if a ventricular contraction does not occur following the atrial contraction. For this reason it is necessary to prevent the pacemaker from misinterpreting a signal on the ventricular electrode at the time of an atrial electrical stimulus as representing a ventricular contraction. In the bifocal pacemaker disclosed in U.S. Pat. No. 3,595,242, the pacemaker heartbeat detecting circuit is inhibited from operating for a short refractory period following the generation of each atrial stimulating pulse. Typically, the atrial stimulating pulse has a duration of two milliseconds, and the heartbeat detecting circuitry is inhibited from operating for eight milliseconds starting with the leading portion of the atrial stimulating pulse. In this manner, the ventricular timing circuit cannot be reset when the atrial stimulating pulse is generated. The ventricular timing sequence continues in its ordinary course, and if the ventricular contraction does not occur on schedule a ventricular stimulating pulse is generated.

However, there are times when a ventricular contraction coincides with an atrial contraction, or follows it within eight milliseconds. In the bifocal demand pacemaker disclosed in my co-pending application, such a ventricular contraction cannot be detected because the ventricular contraction detecting circuitry is inhibited from operating during and immediately following the generation of each atrial stimulus. If a ventricular contraction does occur during the refractory period, the ventricular timing circuit does not reset and a ventricular stimulating pulse is generated at the end of the timing period even though a ventricular contraction has already occurred.

It is a general object of my invention to provide a bifocal demand pacemaker in which an electrical signal on the ventricular electrode resulting from the generation of an atrial stimulus is not interpreted as a ventricular contraction so that a pacemaker atrial refractory interval is not required and a ventricular contraction which does occur during or immediately following the atrial stimulus can be detected.

Briefly, in accordance with the principles of my invention the design of the bifocal pacemaker is predicated on an analysis of the signal frequencies contained in various waveforms, including an atrial stimulating pulse and the QRS waveform (the electrical signal on the ventricular electrode corresponding to a ventricular contraction). The atrial and ventricular stimulating circuits are isolated from each other by the use of a different pair of electrodes for each function, as contrasted with the use of three electrodes (one of which is shared) for the two functions. This isolation cuts down the magnitude of the electrical signal on the ventricular electrode resulting from the generation of an atrial stimulus. However, the signal is not sufficiently small in magnitude to prevent the pacemaker detecting circuitry from treating it as representing a ventricular contraction. Additional circuits are provided for discriminating between the two events based upon the different frequency contents of the two respective signals which appear on the ventricular electrode. In this manner, there is no need to inhibit the operation of the detecting circuitry following the generation of an atrial stimulus, and if a ventricular contraction does occur during or immediately following atrial stimulation the event can be detected.

It is a feature of my invention to provide separate and isolated atrial and ventricular electrodes in a bifocal demand pacemaker, together with a ventricular contraction detecting circuit which can discriminate against signals corresponding to an atrial stimulus.

Further objects, features and advantages of my invention will become apparent upon consideration of the following detailed description in conjunction with the drawing, in which.

Figure 1:
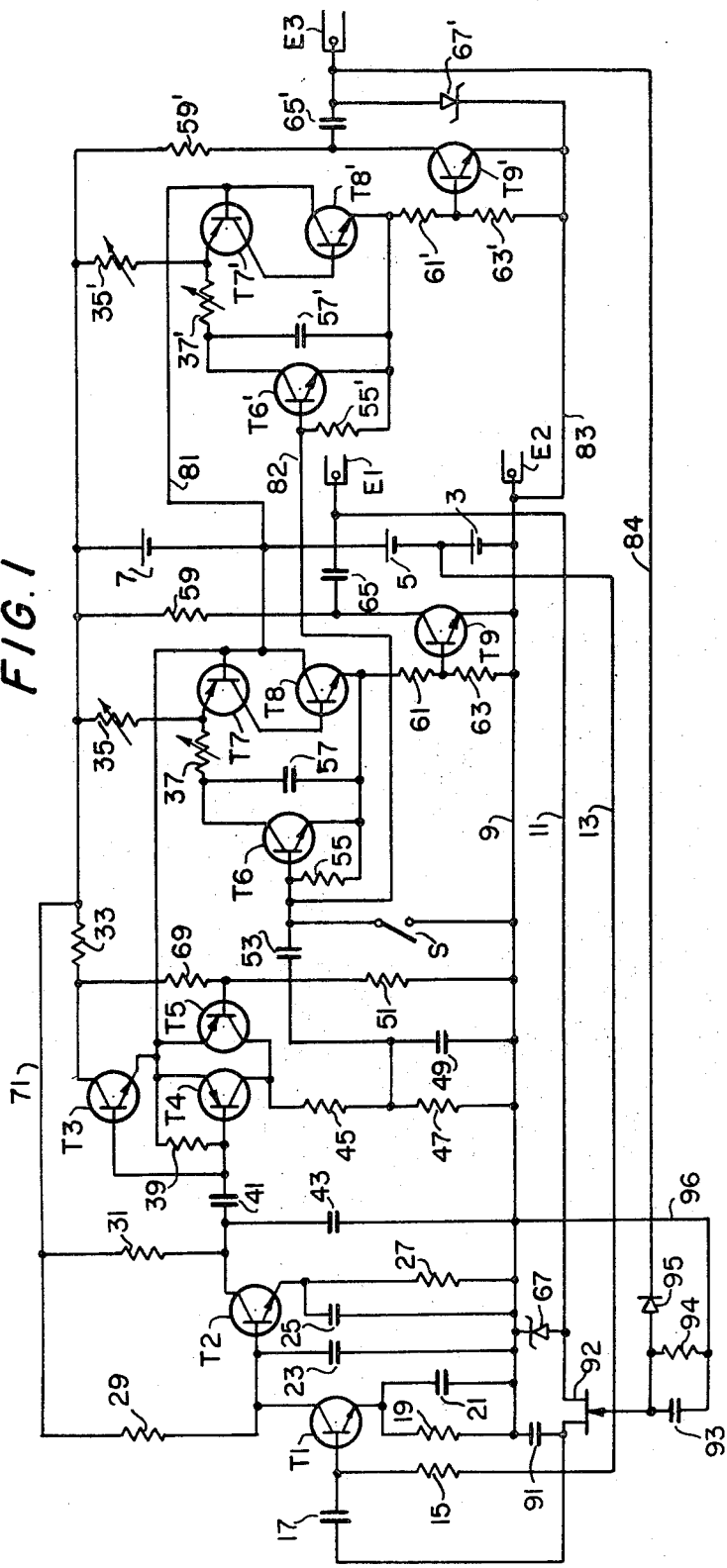
FIG. 1 depicts the illustrative bifocal demand pacemaker disclosed in my copending application, Ser. No. 810,519.

In the pacemaker of FIG. 1, electrode E2 is a neutral electrode (conductor 9 is "grounded"), electrode E1 is the ventricular stimulating electrode and electrode E3 is the atrial stimulating electrode. The ventricular timing and stimulating circuit is contained in the drawing between switch S and electrodes E1 and E2. Capacitor 65 is initially charged by current flowing from batteries 3, 5 and 7 through resistor 59, terminals E1 and E2, and the patient's heart in a time much shorter than the interval between successive heartbeats. The magnitude of resistor 59 is low enough to permit rapid charging of capacitor 65 but high enough to prevent significant attenuation of the signal detected across terminal E1 and E2, these terminals being connected to the implanted electrodes. When transistor T9 is triggered to conduction, the capacitor discharges through it, current flowing from the capacitor through the collector-emitter circuit of the transistor, terminal E2, a cable to one electrode, the heart itself, the other electrode, and another cable back to terminal E1. The discharge of capacitor 65 through the electrodes constitutes the impulse to stimulate the ventricles if necessary. As soon as transistor T9 turns off, capacitor 65 charges once again in preparation for the next cycle. The capacitor serves simply as a source of current when an impulse is necessary. Capacitor 65 is not involved with the various timing sequences used to control the selective generation of impulses.

The capacitor always charges to the peak battery voltage. Because it discharges through an essentially short-circuited transistor switch, the magnitudes of the impulses do not vary as the battery impedance increases with aging. Nor is there any waste of energy between manufacture and implantation — although transistor T9 is gated on during each cycle, as long as the electrodes are open-circuited capacitor 65 cannot discharge.

The capacitor charges, as well as discharges, through the heart so that the net DC current through the electrodes from the pacemaker is zero. Otherwise, electrolytic processes in the heart cells could dissolve the electrodes.

Transistors T7 and T8, connected as shown, are the equivalent of a conventional silicon controlled rectifier. Both are normally non-conducting. When the emitter electrode of transistor T7 goes sufficiently positive, the transistors conduct and current flows through the emitter circuit of transistor T8. Current continues to flow until the potential at the emitter of transistor T7 drops below a predetermined value.

Transistor T9 is a simple current amplifier which is normally non-conducting. When transistor T8 conducts, however, the emitter current flowing through resistors 61 and 63 causes the potential at the base of transistor T9 to increase. At such a time transistor T9 is biased to conduction and capacitor 65 can discharge through it as described above.

The apparatus can be used in a free-running mode, that is, an impulse can be generated at a 72-pulse-perminute rate, for example, independent of the occurrence of natural heartbeats. In such a case, switch S is closed and the base of transistor T6 is connected to the negative terminal of battery 3. Transistor T6 therefore remains in a cut-off condition. Pulses transmitted through capacitor 53 (to be described below) are shorted through the switch away from the transistor. Initially, capacitor 57 is discharged and transistors T7 and T8 are non-conducting. Current flows from batteries 3, 5 and 7 through resistors 35 and 37, capacitor 57, and resistors 61 and 63. The current through resistors 61 and 63 is insufficient to turn on transistor T9. As the capacitor charges, the junction of the capacitor and resistor 37 increases in potential. Thus the emitter of transistor T7 increases in potential. Eventually the potential is sufficient to trigger the relaxation oscillator consisting of transistors T7 and T8. Capacitor 57 discharges through resistor 37 and these two transistors. At the same time current flows from batteries 3 and 5 through the collector-emitter circuit of transistor T8, and resistors 61 and 63. Transistor T9 conducts and capacitor 65 discharges through it to provide an impulse to the ventricles. As soon as capacitor 57 has discharged sufficiently and the potential of the emitter of transistor T7 has dropped to a low enough value, all of transistors T7, T8 and T9 turn off and the impulse is terminated. Capacitor 65 immediately recharges, and capacitor 57 starts charging once again in preparation for the next impulse.

The charging period of capacitor 57, that is, the interval between impulses, is determined by the magnitude of the capacitor, and the magnitudes of resistors 35, 37, 61 and 63. Resistors 37, 61 and 63 are very small in comparison to the magnitude of resistor 35. Consequently, it is the magnitude of resistor 35 which determines the inter-pulse interval. As the magnitude of resistor 35 is adjusted the rate of the impulses varies.

Similarly, it may be desirable to adjust the width of each impulse delivered to the heart. Capacitor 57 discharges through resistor 37 and transistors T7 and T8. The width of the impulse delivered by capacitor 65 is determined by the discharge time of capacitor 57, that is, the time period during which transistors T7 and T8 conduct and thereby turn on transistor T9. By varying the magnitude of resistor 37 the width of each impulse can be adjusted. In the case of an implantable pacemaker, the magnitudes of resistors 35 and 37 would be adjusted prior to implanting the apparatus in the patient.

When switch S is opened, i.e., in the case of a pacemaker required to operate in the demand mode, the same type of free-running operation would take place were there no input in the base of transistor T6 through capacitor 53. Transistor T6 would remain non-conducting and would not affect the charging of capacitor 57. However, with switch S open, pulses transmitted through capacitor 53 are not shorted through the switch away from the base-emitter circuit of transistor T6. With the switch open, each pulse transmitted through capacitor 53 to the base of transistor T6 causes the transistor to conduct. Capacitor 57 discharges through the collector-emitter circuit of the transistor. In such a case, the timing cycle is interrupted and the junction of capacitor 57 and resistor 37 does not increase in potential to the point where transistors T7 and T8 are triggered to conduction. When the apparatus is functioning as a "demand" pacemaker, each ventricular contraction causes a pulse to be transmitted through capacitor 53 to turn on transistor T6. Transistor T6 conducts to discharge capacitor 57 just prior to the time when capacitor 57 would trigger, and discharge through, transistors T7 and T8 to control the generation of an impulse. After capacitor 57 has discharged through transistor T6, the transistor turns off. The capacitor then starts charging once again. The new cycle begins immediately after the occurrence of the last ventricular contraction so that the next impulse, if needed, will be generated immediately after the next natural heartbeat should have been detected were the heart functioning properly.

A similar circuit is provided for generating an atrial stimulating pulse. The various elements to the right of electrodes E1 and E2 are designated by the same numerals as the equivalent elements in the atrial timing circuit with the addition of prime symbols. Except for component magnitudes, the atrial timing circuit is the same as the ventricular timing circuit.

Electrode E3 is implanted in the patient's heart to stimulate his atria. Capacitor 57' charges through potentiometers 35' and 37'. After a predetermined interval, when the capacitor voltage has reached the level required to control conduction of transistors T7' and T8', the two transistors conduct and forward bias the base-emitter junction of transistor T9'. The charge on capacitor 65' flows through transistor T9' and electrodes E2 and E3. The width of each pulse is determined by the setting of potentiometer 37' which determines the time required for capacitor 57' to discharge through transistors T7' and T8'. The inter-pulse interval is determined by the setting of potentiometer 35' which determines the time required for capacitor 57' to charge to the level which causes transistors T7' and T8' to conduct.

Figure 3:
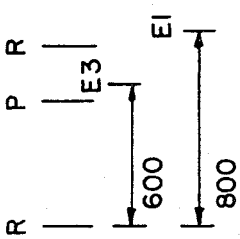
FIG. 3 is a timing diagram which will be helpful in understanding the operation of the pacemaker of FIG. 1.

Any pulse delivered through capacitor 53 as a result of the detection of an R wave causes transistor T6' to conduct along with transistor T6. At the same time that capacitor 57 discharges through transistor T6, capacitor 56' discharges through transistor T6'. In such an event, the timing period of the circuit of FIG. 3 is not concluded and an atrial stimulating pulse is not generated. Instead, the timing begins once again.

FIG. 3 depicts a timing sequence which will be helpful in understanding the pacemaker operation. Two R waves are shown and represent two successive beats (ventricular contractions) of the patient's heart. Typically, the time interval between them is less than 760 milliseconds. The P wave associated with the second R wave is shown occurring before it.

Potentiometer 35' has a value such that capacitor 57' charges to the level required for the conduction of transistors T7' and T8' after 600 milliseconds have elapsed since the last capacitor discharge. The atrial stimulating pulse E3 is thus shown occurring 600 milliseconds after the first R wave. It should be noted that the atria are stimulated following the P wave during a normal heartbeat. Actually, if a P wave has been generated it is an indication that the atria have contracted and an atrial stimulating impulse on electrode E3 is not required. However, if such an impulse is generated following the atrial contraction, that is, during the refractory interval of the atria, it has no effect on the beating action of the patient's heart. (The generation of an atrial stimulating impulse prior to the natural atrial contraction can induce an atrial premature beat which is not desirable.)

Potentiometer 35 in FIG. 1 has a value such that the timing interval for the ventricular stimulation is 800 milliseconds. Thus, the pulse designated E1 in FIG. 5 is shown occurring 800 milliseconds after the first R wave, which is slightly after the second R wave should it be present. If the second R wave is detected on electrode E1, both timing circuits are reset and an impulse is not generated on electrode E1. This is the desired demand-type operation. If a natural heartbeat does not occur within 800 milliseconds after the last heartbeat, an impulse is generated on electrode E1 to stimulate the ventricular contraction. It should be noted that if the heart beats naturally, there will be no ventricular stimulation by the pacemaker. However, there will be atrial stimulation because the 600 millisecond atrial timing interval is less than the natural inter-pulse interval. But in the event a natural atrial contraction does not take place, the atrial stimulation is required in order that the heart function more efficiently. The ventricular stimulation, of course, is provided to correct any AV block. A normal ventricular contraction can occur approximately 120-160 milliseconds after the atrial stimulation. The ventricular timing period is 200 milliseconds longer than the atrial timing period; sufficient time is allowed for a natural ventricular contraction before a ventricular stimulating impulse is generated. In general, the ventricular timing period should exceed the atrial timing period by 160-250 milliseconds.

It should also be noted that the operation of the atrial timing circuit is keyed to the detection of a ventricular contraction on electrode E1. It is highly desirable to key the atrial timing circuit to the beating of the patient's heart — were a free-running generator provided to stimulate the atria, the timing of the beating of the patient's heart might be seriously affected. While the natural timing might change, the circuitry timing would be invariant. For this reason, capacitor 57' is discharged following any beating of the patient's heart. Theoretically, it might be possible to detect an atrial contraction, that is, to detect the P wave, and to discharge capacitor 57' before its timing period is completed so that an atrial stimulating impulse would not be generated if it is not required. However, it is exceedingly difficult to detect the P wave due to its small magnitude as compared to the R wave. For this reason, in the pacemaker of FIG. 1 it is the detection of the R wave which also serves to reset the atrial timing period. Of course, this results in the continuous generation of impulses at electrode E3 if the heart is beating normally (even though impulses at electrode E1 are not generated) because each R wave is detected after the impulse at electrode E3 has been generated. However, the generation of an atrial stimulating impulse during the refractory interval of the atria has been found not to interfere with the normal beating of a patient's heart. (The same is not true of the generation of a ventricular stimulating impulse following a ventricular contraction, and this is the reason for the use of the demand-type pacemaker in the first place.)

It is the function of the circuitry to the left of switch S to detect a natural heartbeat (ventricular contraction), to the exclusion of other undesired signals, and in response thereto to apply a positive pulse to the base of transistor T6 for the purpose of interrupting the charging cycles of capacitors 57 and 57'.

Figure 2:
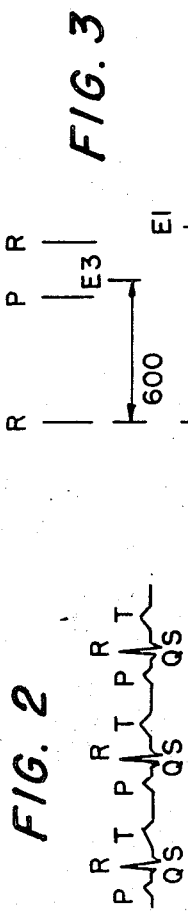
FIG. 2 depicts a typical electrocardiogram.

The natural beating action of the heart produces electrical signals which are characteristic of successive steps in the occurrence of each heartbeat. A heart beating in normal or sinus rhythm produces electrical signals conventionally identified as P, Q, R, S and T waves as shown in FIG. 2.

It is generally recognized by those skilled in the art that it is preferable to distinguish the QRS complex in an electrocardiogram from the P and T waves for the purpose of detecting a natural heartbeat. Actually, with respect to implantable pacemakers it is the cellular electrogram in the vicinity of the electrodes which is important, not the skin electrocardiogram, since the pacemaker responds to the electrical signals generated by the cells in the vicinity of the electrodes. The cellular electrogram is generally considerably different from the skin electrocardiogram. The latter is the integral of all the cellular electrograms generated by a beating action of the heart. Because the various cells generate their signals at different times during each heartbeat, the integral (electrocardiogram) is in many respects dissimilar from an individual cellular electrogram. However, just as the electrocardiogram exhibits a sharply rising R pulse so does the cellular electrogram. It is the sharply rising pulse of the electrogram which is the best indication of a natural heartbeat. Although references below are made to the QRS complex of an electrocardiogram, it must be borne in mind that with respect to the electrodes implanted in the patient's heart it is the sharply rising pulse of the cellular electrogram which is of importance. It has become the practice in the art to focus on the QRS complex of the electrocardiogram, rather than the individual cellular electrogram, primarily because the R wave in the electrocardiogram does for the most part correspond to the sharply rising pulse of the cellular electrogram.

Using the techniques of frequency analysis, it can be shown that the R peak comprises frequency components primarily in the 20–30 Hz region. The P and T waves comprise for the most part lower frequency components. To avoid triggering of transistor T6 by P and T waves, various filters are provided in the circuit to filter out frequencies below 20 Hz. Of course, it is advantageous to provide additional filters to filter out frequencies above 30 Hz, and particularly 60-Hz frequency signals. Such filters are incorporated in the pacemaker depicted in FIG. 1, although it has been found that such filters are not totally effective in preventing the triggering of transistor T6 by 60-Hz stray signals. For this reason, while various filters are associated with amplifying stages T1 and T2, a rate discrimination circuit (including transistors T3, T4 and T5, resistors 45 and 47, and capacitors 49 and 53) is provided to prevent triggering of transistor T6 by 60-Hz stray signals. This rate discrimination circuit will be described below after the frequency discrimination circuit is first considered.

Transistor T1 is normally conducting, the emitter terminal of the transistor being connected through resistor 19 and conductor 9 to the negative terminal of battery 3, and the base of the transistor being connected through resistor 15 and conductor 13 to the positive terminal of the battery. The electrical signals picked up by the electrodes implanted in the patient's heart are coupled across capacitor 17 and resistor 15 in the base circuit of transistor T1. Signals of either polarity are amplified by transistor T1. The transistor is biased for class A operation because the polarity of the detected signal may be of either type depending on the manner in which the electrodes are implanted.

It should be noted that Zener diodes 67 and 67' respectively bridge electrodes E1 and E2, and electrodes E3 and E2. It is possible that very high voltages can appear across the electrodes. For example, if defibrillation equipment is used, a very high voltage may be applied to the patient's heart. To avoid damage to the pacemaker circuitry, the large voltage signals are short-circuited through the Zener diodes. Each diode conducts in the forward direction (for voltages above a few tenths of a volt) as well as for voltages in the reverse direction which are above the breakdown potential of 10 volts.

Capacitor 17 and resistor 15 emphasize the step function in the cellular electrogram. These two elements comprise a differentiator which emphasizes the frequency components above approximately 20 Hz. For such signals, the voltage drop across resistor 15 is appreciable and the input to transistor T1 is relatively large. For lower frequency signals, however, the voltage drop across capacitor 17 is much greater, and a smaller input signal is applied across the base-emitter junction of transistor T1.

Resistor 19 and capacitor 21 in the emitter circuit of transistor T1 serve a similar function. The impedance of the parallel circuit increases as the frequency decreases. The emitter impedance provides negative feedback for the transistor, and the overall gain of the transistor decreases as the frequency decreases.

The amplified signal at the collector of transistor T1 is applied across the base-emitter junction of transistor T2, this transistor also being biased for class A operation. Transistor T2 further amplifies the detected signals. Capacitor 25 and resistor 27 in the emitter circuit of transistor T2 serve the same function as resistor 19 and capacitor 21 in the emitter circuit of transistor T1. This third differentiator further limits the low frequency response of the detecting circuit to discriminate against the P and T waves and any other frequencies well below 20 Hz.

Resistor 29 and capacitor 23 serve as an integrator to reduce high frequency noise components well above 30 Hz. The higher the frequency, the lower the impedance of capacitor 23, the smaller the overall collector impedance of transistor T1, and the lower the gain of the stage. Resistor 31 and capacitor 43 in the collector circuit of transistor T2 serve the same function. Actually, these four elements serve to attenuate frequencies well above 60 Hz and have little effect on 60 Hz signals. In the illustrative embodiment of the invention the rate discrimination stage distinguishes 60-Hz stray signals from desired signals.

AC signals at the collector of transistor T2 are coupled through capacitor 41 to the base of transistor T3 and the base of transistor T4. The overall gain characteristic of stages T1 and T2, from terminals E1 and E2 to the collector of transistor T2 and conductor 9, is such that signals in the 20–30 Hz region are amplified to the greatest extent. The gain curve falls off very rapidly below 20 Hz such that the frequency components characteristic of the P and T waves are not amplified sufficiently for turning on transistors T3 and T4. For frequency components above 30 Hz, the gain for 60-Hz signals is only slightly less than the maximum gain. However, for signals considerably highter, e.g., above 150 Hz, the gain is low enough to prevent false operation of transistors T3 and T4.

If transistors T3 and T4 require a signal of approximately 1 volt to conduct, and the maximum gain of stages T1 and T2 is above 50, it is apparent that 20-mv signals in the 20–30 Hz region at the electrodes can trigger transistors T3 and T4 to conduction. The 20–30 Hz components in the electrical signal generated by the beating of the heart in the vicinity of the electrodes is typically above 20 mv. The frequency components characteristic of the P and T waves are not only 2–3 times smaller in magnitude than those characteristic of the R wave, but since the gain of stages T1 and T2 in the region around 5 Hz is only a fraction of the maximum gain, these signals do not trigger transistors T3 and T4 to conduction.

The rate discriminator stage includes three transistors T3, T4 and T5 which collectively comprise a bi-phase switch having two functions. First, the switch serves to provide unipolar current pulses to charge capacitor 49. However, the switch is not a true rectifier because of its second function. This function is to provide unipolar pulses of constant magnitude independent of the amplitude of input signals above a threshold value. Any signal through capacitor 41, either positive or negative, which exceeds a threshold value (typically, 1 volt) results in a unipolar current pulse of predetermined magnitude being fed through resistor 45 to charge capacitor 49.

The emitter of transistor T4 is connected to the positive terminal of battery 5, while the base of the transistor is connected through bias resistor 39 to the same potential. Transistor T4 is normally non-conducting. However, when a negative signal is transmitted through capacitor 41 the transistor turns on and current flows from battery 5 through the emitter-collector circuit of the transistor, resistor 45, and the parallel combination of resistor 47 and capacitor 49. The capacitor thus charges toward a maximum voltage determined by batteries 3 and 5, the drop across transistor T4, and resistors 45 and 47. If the emitter-collector circuit of the transistor is considered to have negligible impedance, the charging current is determined solely by the magnitude of the batteries, and the magnitudes of elements 45, 47 and 49. The magnitude of the negative input signal is of no moment. As long as it is above the threshold value necessary for controlling the conduction of transistor T4, a current pulse of predetermined magnitude will be delivered to charge capacitor 49.

A positive signal transmitted through capacitor 41, on the other hand, has no effect on transistor T4. However, it does cause transistor T3 to conduct, current flowing from battery 7 through resistor 33 and the collector-emitter circuit of transistor T3. It is necessary that the positive signal transmitted through capacitor 41 also result in a unipolar pulse of the same polarity to charge capacitor 49. The collector output of transistor T3 cannot be used for this purpose because it drops in potential when transistor T3 conducts. For this reason, phase inverter T5 is provided. While the emitter of this transistor is connected to the negative terminal of battery 7, the base of the transistor is connected to the junction of resistors 51 and 69. Normally the transistor is non-conducting. However, when transistor T3 conducts and the collector voltage drops, so does the base potential of transistor T5. At this time transistor T5 conducts, current flowing from the positive terminal of battery 5 through the emitter-collector circuit of transistor T5 to resistor 45. It is thus seen that any changing signal transmitted through capacitor 41 above a threshold value causes a unipolar pulse to be delivered to the charging circuit.

Consider for the moment unipolar pulses delivered by either transistor T4 or transistor T5, or both of them, occurring at a very slow rate. Each current pulse causes capacitor 49 to charge, current flowing through resistor 45 and the capacitor. (Some of the current flows through resistor 47 but capacitor 49 keeps charging and the voltage across it keeps increasing). When the pulse terminates, capacitor 49 starts discharging through resistor 47. Assuming that each charging pulse is sufficient to fully charge capacitor 49, the potential across the capacitor will equal the sum of the magnitudes of batteries 3 and 5, multiplied by the voltage divider ratio of resistors 47 and 45 (less any drop across transistor T4). (The exception of narrow RF input pulses will be described below.) When each unipolar pulse terminates, capacitor 49 starts discharging through resistor 47. If the capacitor fully discharges by the time the next charging pulse is delivered, the capacitor will then recharge to the maximum voltage, after which it will fully discharge once again. The potential across capacitor 49 is AC-coupled through capacitor 53 to the base of transistor T6 and the base of transistor T6'. Each charging pulse increases the potential across capacitor 49 from zero to the maximum voltage. The positive step is sufficient to cause transistors T6 and T6' to conduct, thereby discharging capacitors 57 and 57' and inhibiting the next impulses which would otherwise have been generated.

Consider now charging pulses which occur at a faster rate, e.g., at a rate of 72 per minute which is expected as a result of natural heartbeats. Each charging pulse charges capacitor 49 to the maximum voltage. The capacitor then starts to discharge through resistor 47 but before the discharge is complete another charging pulse occurs. The capacitor immediately charges to the maximum voltage and then starts to discharge once again. The capacitor never fully discharges, but the minimum voltage across it (that at the end of the discharge cycle when the next charging pulse is received) is low enough such that the increase in the capacitor voltage with the occurrence of each charging pulse is still sufficient to trigger transistors T6 and T6'. Consequently, each charging pulse which results from a natural heartbeat resets both timing circuits.

Consider now the effect of 60-Hz signals on the circuit. If a stray 60-Hz signal is applied to the base of transistor T3 and the base of transistor T4, each of these transistors conducts during each cycle, transistor T3 for some time during the positive half-cycle and transistor T4 for some time during the negative half-cycle. Consequently, charging pulses are delivered to capacitor 49 at the rate of 120 per second. This is a rate considerably greater than 72 per minute. Each pulse fully charges capacitor 49 and the next pulse is delivered before the capacitor has had an opportunity to discharge to any meaningful extent. Consequently, although each pulse fully charges the capacitor, the increase in the capacitor voltage is negligible because the capacitor voltage never decreases much below the maximum potential. Consequently, steps of negligible magnitude are transmitted through capacitor 53 to the base of transistor T6 and the base of transistor T6'. Each transistor requires a signal of approximately 0.5 volts for conduction, and the step functions delivered through capacitor 53 are well below this value as the result of unipolar pulses occurring at a rate of 120 per second.

Activations of transistors T3 or T4 at a rate above 40 per second (an inter-activation period of 25 milliseconds) are sufficient to prevent appreciable discharge of capacitor 49 and the triggering of transistor T6. It will be seen that should any 60-Hz signals, or signals of any higher frequency, be present in the circuit, step functions of insufficient magnitude to trigger transistors T6 and T6' are transmitted through capacitor 53. Transistors T6 and T6' remain non-conducting and the pacemaker operates in its free-running mode. Even if there are natural heartbeats at this time, they have no effect. Each natural heartbeat causes a charging pulse to be delivered to capacitor 49, but it has no effect since the capacitor is at all times charged to almost its peak value. Only in the absence of undesirable high frequencies does the capacitor have an opportunity to discharge prior to the delivery of a current pulse resulting from a natural heartbeat. It is only at this time that each natural heartbeat results in the conduction of transistors T6 and T6' and the resetting of the timing circuits. In effect, resistors 45 and 47, and capacitor 49, can be thought of as a high inertia switch. This switch cannot respond to beats above a rate of 40 per second. Any repetitive signal above 40 per second is ineffective to deactivate the impulse generating circuits.

Of course, during the time that stray 60-Hz signals, or other undesirable signals, are present, the pacemaker operates in its free-running mode along with the natural beating of the patient's heart. This may be disadvantageous, but it is far better than allowing the pacemaker to cease functioning at all — a disastrous condition if at the particular time the patient's heart has stopped functioning.

While very high frequency signals have the same effect on capacitor 49 as 60-Hz signals, there is one type of signal which is not prevented from falsely operating transistors T6 and T6' by the lack of discharge of capacitor 49. Specifically, single pulses of very narrow width can cause either of transistors T3 or T4 to conduct and a charging pulse to be delivered to capacitor 49. If capacitor 49 is discharged at this time (as it would be before the end of each cycle) the positive step across capacitor 49 can falsely trigger transistors T6 and T6'. To preclude this possibility, resistor 45 is provided. Although each charging pulse causes a rapid rise in potential across capacitor 49, the rise is not a perfect step function because resistor 45 increases the charging time constant. With a very narrow pulse, by the time capacitor 49 has begun to charge appreciably, the pulse terminates. Consequently, capacitor 49 does not charge sufficiently to trigger transistors T6 and T6'.

Transistors T1 and T2 serve a different function than transistors T3, T4 and T5. The first two transistors, together with the various differentiators and integrators connected to them, serve as a frequency discriminator. Although higher frequencies are somewhat attenuated, it is the attenuation of the lower frequencies (below 20 Hz) which is of the utmost importance. By attenuating these signal frequencies and distinguishing between the different waves in the myocardial signal, it is possible to prevent triggering of transistors T6 and T6' by P and T waves. Although the frequency discrimination circuit attenuates signals below 20 Hz, this should not be confused with beats at a 72-per-minute rate. It is the emphasis on signal frequencies in the 20–30 Hz region which insures that beats at a 72-per-minute rate appear at the base of transistor T3 and the base of transistor T4 as a result of the R waves to the exclusion of other signals. As far as signals transmitted through capacitor 41 are concerned, it is more convenient to analyze the operation of the pacemaker in terms of activation rates. The frequency components in any particular signal are not determinative once the signal has been transmitted through capacitor 41. From that point on, the important consideration is the number of activations of either transistor T3 or T4 during any given period of time. Since for any signal the bi-phase switch delivers a current pulse of predetermined magnitude to the capacitor charging circuit, it is the rate discrimination circuit which prevents cancellation of the pacemaker stimuli by competitive sine wave interference or any other interference from signals occurring at a rate greater than a minimum value. In the pacemaker of FIG. 1, interference is prevented for all signals occurring at a rate greater than 40 per second.

It is possible in some cases that the atrial stimulating pulse will produce an electrical signal on electrode E1 which after amplification will cause the two timing circuits to be reset. For this reason, FET switch 92 is inserted in conductor 11 between electrode E1 and capacitor 17 in the base circuit of transistor T1. The switch is normally conducting due to its connection through resistor 94 to ground conductor 9. The negative pulse generated at electrode E3 is transmitted over conductor 84 and through diode 95 to capacitor 93. The capacitor charges and turns off the FET switch. When the atrial stimulating pulse terminates (after a typical duration of 2 milliseconds), capacitor 93 discharges through resistor 94. The time constant of the capacitor-resistor combination is such that the FET switch remains off for approximately an additional 6 milliseconds to prevent erroneous detection of a ventricular contraction for a few additional milliseconds until after all transients have died down. In this manner, the heartbeat detection circuit is disabled during each atrial stimulation and for a short interval thereafter. (Capacitor 91 is provided to short high frequency transients, arising from the FET switching, to conductor 9.)

It is possible, however, for a true ventricular contraction to occur within the 8-millisecond refractory period controlled by FET switch 92. In the pacemaker of FIG. 1, such a ventricular contraction is not detected because the signal on electrode E1 is not transmitted through the switch and capacitor 17 to the base of transistor T1. It is desirable that the ventricular contraction be detected in order to reset the ventricular timing circuit. The atrial timing circuit re-starts anyway inasmuch as capacitor 57' discharges in order to generate the atrial pulse in the first place. But capacitor 57 continues to charge if transistor T6 is not turned on with the occurrence of the ventricular contraction.

Figure 4:
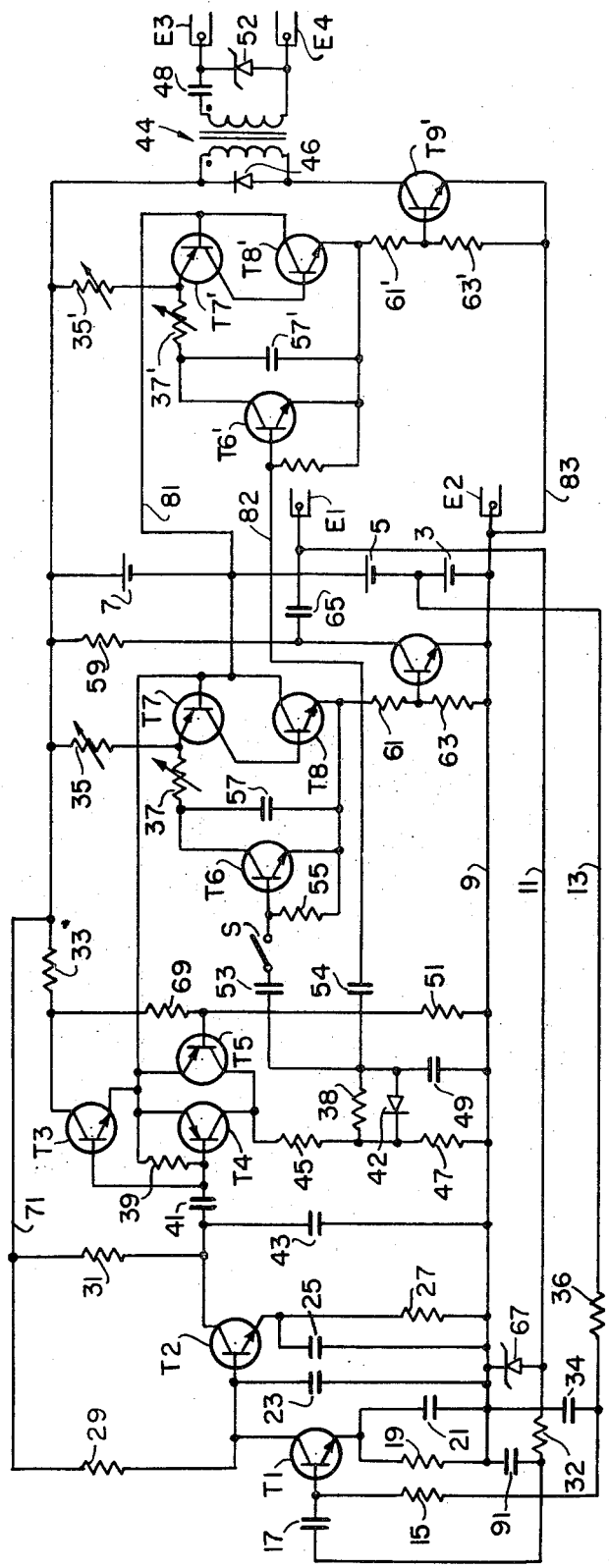
FIG. 4 depicts the illustrative embodiment of the present invention.

The pacemaker of FIG. 4 is similar to that of FIG. 1 except that the inhibiting circuit including FET switch 92 is omitted. The ventricular timing circuit in the pacemaker of FIG. 4 can be reset if a ventricular contraction occurs during or immediately after the generation of an atrial stimulating pulse. At the same time, in the absence of such a ventricular contraction, the atrial stimulating pulse does not cause transistor T6 to turn on thus resetting the ventricular timing circuit.

The circuit of FIG. 4 is different from the circuit of FIG. 1 in a number of respects. First, instead of providing a single atrial stimulating electrode E3, which shares ground electrode E2 with ventricular stimulating electrode E1, two separate atrial stimulating electrodes E3 and E4 are provided. Thus the collector circuit of transistor T9' in FIG. 4 is different from that of FIG. 1. Second, instead of providing FET switch 92 as in FIG. 1, the circuit of FIG. 4 includes filter circuits for attenuating the signal on electrode E1 which results from the generation of an atrial stimulating pulse. Third, instead of providing a direct connection between the upper terminals of resistor 47 and capacitor 49 as in FIG. 1, a parallel connection of resistor 38 and diode 42 is provided in the circuit of FIG. 4. Fourth, the arrangement of switch S is slightly different in the circuit of FIG. 4, and two separate capacitors 53 and 54 are provided instead of the single capacitor 53 of FIG. 1.

In the pacemaker of FIG. 1, the atrial stimulating pulse on electrode E3 can cause a significant signal on ventricular-contraction detecting electrode E1. This is due to the fact that ground electrode E2 is shared by the two other electrodes. Each of electrodes E1 and E3 is connected through the heart to electrode E2. Electrode E2 has some impedance and it is apparent that when an atrial stimulating pulse is generated and current flows between electrodes E3 and E2, the potential on electrode E2 rises due to the voltage drop across it. The increased potential is in turn extended through the heart to electrode E1.

In order to eliminate the atrial refractory period of the pacemaker, as a first step it is desirable to attenuate the signal on electrode E1 which results from the generation of an atrial stimulating pulse. This is achieved in the pacemaker of FIG. 4 by providing a separate pair of electrodes E3 and E4 for the atrial stimulating circuit. When an atrial pulse is generated, current flows between electrodes E3 and E4. Because electrode E2 is not shared by electrodes E1 and E3, a significant rise in potential is not extended to electrode E1.

Capacitor 65' is no longer used to store charge preparatory to the generation of each atrial stimulating pulse. Instead, the conduction of transistor T9' causes a pulse to be transmitted through transformer 44 to electrodes E3 and E4. When the transistor turns on, current flows from batteries 3, 5 and 7 through the primary winding of transformer 44 and the collector-emitter circuit of transistor T9' to ground conductor 9. The current pulse through the primary winding of transformer 44 causes a voltage pulse to appear across the secondary winding of the transformer. This pulse is transmitted through capacitor 48. Electrode E3 goes positive with respect to electrode E4 and current flows through the atrium to which the electrodes are connected.

Capacitor 48 is provided to prevent the flow of direct current in the event the electrodes become polarized. Zener diode 52 is provided in place of Zener diode 67' in FIG. 1. The diode is poled such that it is reverse biased when the current stimulating pulse is generated. However, in the event of an excessive signal appearing across the electrodes resulting from an external source, the diode conducts in the forward direction if the signal exceeds a few tenths of a volt and it conducts in the reverse direction if the signal exceeds 10 volts. In either case, the magnitude of the pulse extended in the reverse direction through transformer 44 to the collector circuit of transistor T9' can cause no damage.

Diode 46 is provided to allow the current through the primary winding of the transformer to dissipate when transistor T9' turns off at the end of each pulse. The current continues to flow in the same direction through the primary winding but it now flows through diode 46 instead of transistor T9'. The diode is reverse biased when transistor T9' conducts so that during the generation of the current pulse it has no effect on the circuit operation. The use of the diode in this manner allows the rapid disappearance of the magnetic field produced by the current flow through the primary winding at the end of the atrial stimulating pulse.

Because the current path for the atrial stimulating pulse is through the heart tissue between electrodes E3 and E4, and does not include electrodes E1 and E2 or the heart tissue in which they are implanted, the potential on electrode E2, and the potential on electrode E1 reflected through the heart tissue between electrodes E1 and E2, is much less than the potential which is developed on the same electrode in the pacemaker of FIG. 1. As a practical matter, however, the potential on electrode E1 may still be sufficient, after amplification by transistors T1 and T2, to cause the ventricular timing circuit to be reset. For this reason the pacemaker of FIG. 4 includes additional circuitry for preventing resetting of the ventricular timing circuit.

The atrial stimulating pulse has a typical duration of 2 milliseconds. Due to its short width, the pulse is characterized primarily by relatively high-frequency components. In the pacemaker of FIG. 1, electrode E1 is connected through FET switch 92 directly to capacitor 17. If the FET switch is omitted, it is apparent that electrode E1 is coupled directly to the base of transistor T1 through the capacitor. In the pacemaker of FIG. 4, electrode E1 is coupled through resistor 32 to capacitor 17. One end of the resistor is connected through capacitor 91 to ground conductor 9. Capacitor 91 in the pacemaker of FIG. 1 serves to short high-frequency switching transients of FET switch 92 to ground. In the pacemaker of FIG. 4, resistor 32 and capacitor 91 comprise a low-pass filter which reduces the spike transmitted through capacitor 17 to the base of transistor T1 when an atrial stimulating pulse is generated. Typically, the cut-off frequency of the low-pass filter comprising resistor 32 and capacitor 91 is 15 Hz. The filter has little effect on the QRS signal which is detected at electrode E1 because the QRS waveform is characterized primarily by frequencies above 15 Hz. But the low-pass filter does attenuate the relatively high-frequency signal on conductor 11 which appears when the atrial stimulating pulse is generated.

In the pacemaker of FIG. 1, the base bias potential for transistor T1 is derived by the connection of conductor 13 from the junction of batteries 3 and 5 to resistor 15. Although ideally the batteries have no source impedance, as a practical matter the batteries do exhibit some impedance. When the atrial stimulating pulse is generated, the current which flows through the batteries does cause a change in the potential exhibited across each battery. Thus even though the use of an isolated pair of electrodes in the atrial stimulating circuit and the incorporation of an additional low-pass filter do cut down the magnitude of the spike transmitted through capacitor 17 to the base of transistor T1 when an atrial stimulating pulse is generated, the change in the voltage across battery 3 when the atrial stimulating current flows can cause the base potential of transistor T1 to change. This change in base potential produces the same effect as the transmission of a spike through capacitor 17— the amplified signal can cause the ventricular timing circuit to be reset. To minimize changes in the base potential of transistor T1 as a result of the battery source impedance, resistor 36 and capacitor 34 are provided.

The resistor and capacitor form another low-pass filter. The atrial stimulating current pulse which flows through battery 3 causes a 2-millisecond voltage spike to appear across the battery terminals. The pulse is characterized by relatively high frequencies and they are attenuated by the low-pass filter so that the resulting spike transmitted through resistor 15 to the base of transistor T1 is minimal. The cut-off frequency of the low-pass filter comprising resistor 36 and capacitor 34 can be much higher than the 15-Hz cut-off frequency of the low-pass filter comprising resistor 32 and capacitor 91. The latter filter should not attenuate the frequencies which characterize the QRS waveform and consequently the cut-off frequency is only 15 Hz. But since there is no need to transmit the QRS signal through resistor 15 to the base of transistor T1, resistor 36 and capacitor 34 can attenuate even the higher frequencies characteristic of the QRS waveform. For this reason the cut-off frequency of the low-pass filter inserted in conductor 13 can be orders of magnitude higher than the cut-off frequency of the low-pass filter inserted in conductor 11.

Even with these modifications to the circuit of FIG. 1, however, it is possible for the signal on electrode E1 which results from the generation of an atrial stimulating pulse to be great enough such that after amplification one of transistors T4 and T5 conducts. In such a case, the rise in potential across capacitor 49 would cause transistor T6 to turn on and the ventricular timing circuit to be reset. For this reason, yet another modification is made in the pacemaker of FIG. 1 to reduce the possibility of false triggering of transistor T6.

The short-duration (2-millisecond) atrial stimulating pulse, even if it causes one of transistors T4 and T5 to conduct, causes the transistor to turn on only for 2 milliseconds. This short-duration pulse is similar to an RF spike for which the circuit including resistor 45, resistor 47 and capacitor 49 is designed to attenuate. Resistor 45 is included in the circuit so that capacitor 49 charges slowly with respect to the width of an RF spike. Only a relatively wide spike, such as that produced with the detection of a QRS waveform signal on electrode E1, results in the charging of capacitor 49 to a sufficient level for triggering transistor T6. To further reduce the possibility of a spike resulting from the generation of an atrial stimulating pulse charging capacitor 49 to a level sufficient to trigger transistor T6, resistor 45 can be increased in magnitude. With a sufficiently large resistor, capacitor 49 can be prevented from charging sufficiently from a 2-millisecond spike to trigger the transistor. However, if resistor 45 is increased in magnitude even a spike resulting from the detection of a QRS waveform signal may not charge capacitor 49 sufficiently to trigger transistor T6. This is due to the fact that resistor 45 and resistor 47 form a voltage divider, and the larger resistor 45 the smaller the source potential for charging capacitor 49. Even a spike resulting from the detection of a QRS waveform may not charge capacitor 49 sufficiently to trigger transistor T6 if resistor 45 is increased greatly in magnitude.

In the circuit of FIG. 4, instead of connecting capacitor 49 directly to the junction of resistors 45 and 47, the capacitor is connected to the resistor junction through the parallel circuit including resistor 38 and diode 42. The current which flows from the collector of one of transistors T4 and T5 flows through resistor 45 and resistor 38 in the capacitor charging path. The incorporation of resistor 38 in the circuit is equivalent to increasing the magnitude of resistor 45 insofar as delaying the charging of capacitor 49 is concerned. However, by connecting resistor 38 to the junction of resistors 45 and 47, rather than increasing the magnitude of resistor 45, the maximum charging of capacitor 49 is not affected to as great an extent. Consequently, while resistor 38 delays the charging of capacitor 49 so that the relatively narrow spike resulting from the generation of an atrial stimulating pulse does not charge capacitor 49 sufficiently to trigger transistor T6, the relatively wide spike resulting from the detection of a ventricular contraction does cause capacitor 49 to charge sufficiently to trigger the transistor.

However, the use of resistor 38 affects the operation of the circuit in yet another manner. It will be recalled that the spike resulting from each QRS waveform charges capacitor 49 in FIG. 1, the capacitor thereafter discharging through resistor 47. The capacitor must discharge sufficiently during the inter-beat interval in order that the spike resulting from each QRS waveform be capable of increasing the voltage across the capacitor. If the capacitor does not discharge sufficiently, the rise in potential across the capacitor with the conduction of transistor T4 or T5 will not be sufficient for turning on transistor T6. In fact, the rate discrimination circuit operates in such a manner that pulses at too rapid a rate do not permit the capacitor to discharge sufficiently — each pulse charges the capacitor only slightly and transistor T6 does not turn on. With resistor 38 included in the circuit of FIG. 4, it is apparent that the discharge path now includes this resistor as well as resistor 47. The increased time constant of the discharge circuit may not permit capacitor 49 to discharge sufficiently between beats; transistor T6 may not conduct when each QRS waveform is detected.

For this reason, diode 42 is included in the circuit. The diode conducts current only when capacitor 49 is discharging and current flows in the forward direction through the diode. In such a case, resistor 38 is effectively short-circuited by the diode whose impedance is negligable. Consequently the discharge circuit in the pacemaker of FIG. 4 is basically the same as that in the pacemaker of FIG. 1 since resistor 38 is effectively removed from the circuit. The resistor is effective only during the charging cycle of capacitor 49 since when current flows from one of transistors T4 and T5, it flows through resistor 38 from left to right and diode 42 is reverse biased. The incorporation of diode 42 in the circuit allows resistor 38 to be used to increase the charging time constant of the rate discrimination circuit, without affecting the discharge time constant. The circuit can be adjusted, for example, such that one of transistors T4 and T5 must conduct for at least 10 milliseconds (at intervals corresponding to the normal heartbeat rate) in order for the voltage rise across capacitor 49 to be sufficient to turn on transistor T6. The atrial stimulating pulse which is only 2 milliseconds in width, even if it causes one of transistors T4 and T5 to conduct, will not allow capacitor 49 to charge sufficiently to turn on transistor T6.

Referring to the pacemaker of FIG. 1, it will be recalled that at the end of the atrial timing period when transistors T7' and T8' conduct, the voltage drop across resistors 61' and 63' increases. This increase in potential is fed back through resistor 55' to conductor 82. Of course, it is necessary that the increased potential on conductor 82, connected to the base of transistor T6, not be sufficient to turn on transistor T6 which would in turn reset the ventricular timing circuit. In the circuit of FIG. 1, transistor T6 does not turn on because resistor 55', and capacitors 53 and 49, form an integrating circuit. The potential at the junction of capacitor 53 and resistor 55' (the base of transistor T6) cannot rise instantaneously when the potential at the junction of resistors 55' and 61' rises with the generation of the atrial stimulating pulse. The atrial stimulating pulse is sufficiently short in duration such that the voltage at the base of transistor T6 does not rise sufficiently to turn the transistor on by the time the atrial stimulating pulse is terminated.

However, I have found that it is possible to provide better isolation between the two timing circuits and this is achieved in the circuit of FIG. 4 with the use of an additional capacitor 54. Conductor 82 is coupled through this additional capacitor to the junction of capacitor 53 and capacitor 49. The rise in potential across capacitor 49 with the conduction of one of transistors T4 and T5 now results in the transmission of a pulse through capacitor 53 (when switch S is closed) to the base of transistor T6 and the transmission of a pulse through capacitor 54 to the base of transistor T6'. Each transistor conducts as required when a QRS waveform is detected. However, when the atrial stimulating pulse is generated, the pulse reflected back along conductor 82 is now transmitted through capacitor 54 to the junction of capacitors 49 and 53, rather than being coupled directly to the base of transistor T6 as in the circuit of FIG. 1. Capacitor 49 is greater in magnitude than capacitor 53 so that the pulse transmitted through capacitor 53 to the base of transistor T6 is even further reduced in magnitude to prevent conduction of transistor T6. The use of an additional capacitor 54 in this manner further isolates the two timing circuits from each other.

It should be noted that switch S in the pacemaker of FIG. 4 is connected in series with the base of transistor T6 rather than in parallel with it as in the circuit of FIG. 1. In the circuit of FIG. 1, when switch S is closed, the base of transistor T6 and the base of transistor T6' are shorted to ground and both pulse-generating circuits operate in the continuous mode. When switch S is open, both pulse-generating circuits function in the demand mode. In the circuit of FIG. 4, a slightly different arrangement is used — switch S is placed in series with the base of transistor T6. When the switch is open, the ventricular timing circuit operates in the continuous mode since no pulses are transmitted through capacitor 53 to trigger transistor T6 and discharge capacitor 57. When the switch is closed, on the other hand, the ventricular timing circuit operates in the demand mode. As for the atrial timing circuit, it operates in the demand mode at all times. Even with switch S open and the ventricular stimulating circuit operating in the continuous mode, each ventricular contraction is detected and causes a pulse to be extended through capacitor 54 to reset transistor T6'. The atrial timing period thus starts over again with each ventricular contraction. This arrangement is most satisfactory because it allows the two timing circuits to be synchronized to each other even when the ventricular timing circuit operates in the continuous mode.

Although the invention has been described with reference to a particular embodiment, it is to be understood that this embodiment is merely illustrative of the application of the principles of the invention. Numerous modifications may be made therein and other arrangements may be devised without departing from the spirit and scope of the invention.

What is claimed is:

1. A rate discrimination circuit capable of use with a demand heart pacemaker consisting of means resonsive to both positive and negative signals for detecting the occurrence of an event, a capacitor, charging resistance means connected in series with said capacitor, means for applying a current pulse to said charging resistance means for charging said capacitor responsive to each operation of said detecting means, discharging resistance means connected to said capacitor for discharging said capacitor between applications of said current pulses, output means capacitively coupled to said capacitor and operative in response to each rise in potential across said capacitor greater than a predetermined value, said charging and discharging resistance means including a common resistance path, a diode connected across said common resistance path poled in the direction of flow of discharge current from said capacitor conducting during the operation of said discharging means for decreasing the impedance of said common resistance path when said capacitor is charged to a voltage greater than the forward voltage drop of said diode and when said capacitor is discharging, first means for establishing the width of each applied current pulse equal to the duration of the detected event, second means for establishing the impedance of said common resistance path large enough to prevent a rise in potential across said capacitor equal to said predetermined value if an applied current pulse has a width shorter than the duration of a predetermined event, and wherein said discharging resistance means has a magnitude, when the impedance of said common resistance path is reduced, sufficiently small to permit the discharge of said capacitor to a level low enough such that the next applied current pulse causes the voltage rise across said capacitor to equal said predetermined value if said next current pulse occurs at a time after the preceding current pulse which exceeds a predetermined time interval, said predetermined time interval being the reciprocal of the rate to be discriminated against.

* * * * *